United States Patent [19]

Magi et al.

[11] Patent Number: 4,636,847

[45] Date of Patent: Jan. 13, 1987

[54] TEST APPARATUS

[75] Inventors: Hugo Magi, Unionville; Arthur J. Boas; Jerry R. Waese, both of Toronto, all of Canada

[73] Assignee: Cabletest International Inc., Markham, Canada

[21] Appl. No.: 802,912

[22] Filed: Nov. 29, 1985

[51] Int. Cl.[4] .......................... H04N 7/18; G06K 9/00

[52] U.S. Cl. .................................... 358/101; 356/394; 382/8; 379/25

[58] Field of Search ................ 358/101, 106; 356/394; 382/8; 179/175.25

[56] References Cited

U.S. PATENT DOCUMENTS 4,555,799 11/1985 Kodama .................................. 382/8

*Primary Examiner*—Howard W Britton

*Attorney, Agent, or Firm*—Hirons, Rogers & Scott

[57] ABSTRACT

The invention provides apparatus to inspect the colored insulation on wires placed in equipment to add contacts or to mould a termination on the wires. The apparatus ensures that the correct color relationships are present before crimping or moulding and disarms the equipment until this correct relationship is established. The equipment can be operated only after the relationship has been established.

5 Claims, 4 Drawing Figures

TEST APPARATUS

This invention relates to the manufacture of electrical cable connectors and extension cables which have moulded terminations at their ends, and more particularly to apparatus for ensuring that colour-coded wires in a cable are arranged correctly prior to steps in the manufacture to thereby limit the possibilities of contacts being applied incorrectly to the wires or the wires and contacts being positioned incorrectly prior to moulding the termination to the cable.

Electrical connection to appliances is commonly by a flexible cable connector having a termination or plug for engagement in a wall socket at one of its ends and exposed colour-coded wires at the other end. Where the termination includes a ground contact it is critical for reasons of safety that the contacts in the termination be in the correct physical relationship and connected to the appropriate wires in the cable. A faulty termination could result in an installer making the correct colour connections between the cable and an appliance and yet have a live electrical connection to the frame of the appliance when the termination at the other end of the cable is engaged in a wall socket.

Other problems can occur, such as cross-connections caused by wires touching one another in the termination, and poor connection between the wires and the contacts of the termination. These problems can be found by testing from the termination end of the cable and are not problems addressed by this invention.

If the contacts are connected to the wrong wires, testing can be done after moulding only by checking the electrical continuity between each of the contacts and the corresponding coloured wire at the other end of the cable. This is inconvenient and labour intensive due to the way cables are handled during manufacture and also because of the sheer bulk of the longer cables.

The aforementioned comments of course apply equally well to so-called "extension cables" fitted with a moulded plug and at the other end with a socket.

During manufacture, the cable and wires are stripped, and then the colour-coded insulations on the wires are used to relate these wires to the appropriate contacts. Once in place the contacts are crimped on to the wires and this sub-assembly is then moved to a moulding station. Here the colour-coding is again used to identify the wires and contacts for placing the contacts and ends of the wires in a mould cavity.

The accuracy of these procedures is dependent entirely on operator accuracy, which will vary between operators. Also, even the best operator will make mistakes due to the repetitive nature of the work.

For these reasons it is desirable to provide apparatus which checks that wires are positioned correctly in jigs where contacts are to be crimped in a fixed relationship to the wires, and also before moulding, that the wires are arranged correctly in the mould. This latter task can be used to check both wire and contact arrangements if the contacts are discrete shapes which will fit into the mould in one arrangement only. Once so fitted, if the wires have been attached correctly to the contacts, the colour arrangement should be correct. If it is not, then the contacts have been attached incorrectly. Of course, there is then a scrapped assembly so it is often preferable to test the positioning of the wires before crimping the contacts to the wires in order to minimise scrap.

Accordingly, in one of its aspects, the invention provides apparatus to inspect the coloured insulation on wires placed in equipment to add contacts or to mould a termination on the wires. The apparatus ensures that the correct colour relationships are present before crimping or moulding and disarms the equipment until this correct relationship is established. The equipment can be operated only after the relationship has been established.

In another of its aspects, the invention provides apparatus for use with a moulding machine for moulding terminations on cables. The cables have a plurality of wires coded individually in differently coloured insulation. Each of the wires is intended for location in a discrete site within the mould prior to closing the mould and completing the termination. The apparatus comprises a colour responsive camera focused to create an electronic image of the coloured insulations when the wires are on the sites and in place for moulding, and memory means containing first information corresponding to the colours and locations of the insulation when these insulations are positioned correctly in the mould. Comparator means receives the electronic image and converts the image into second information and includes means comparing the first and second informations to create signal indicating that the informations correspond. Means is coupled to the moulding machine to render the moulding machine inoperable in the absence of said signal and to permit normal operator use of the moulding machine on receiving this signal.

These and other aspects of the invention will be better understood with reference to the drawings in which.

As mentioned previously, the invention is intended to be used to ensure attachment of the contacts to the correct wires and also to ascertain that the wires are located correctly in sites of a mould prior to moulding the termination to the cable. The latter procedure will be described initially as exemplary of both procedures and it will be assumed initially that the contacts are connected to the correct wires.

Figures 1, 2:
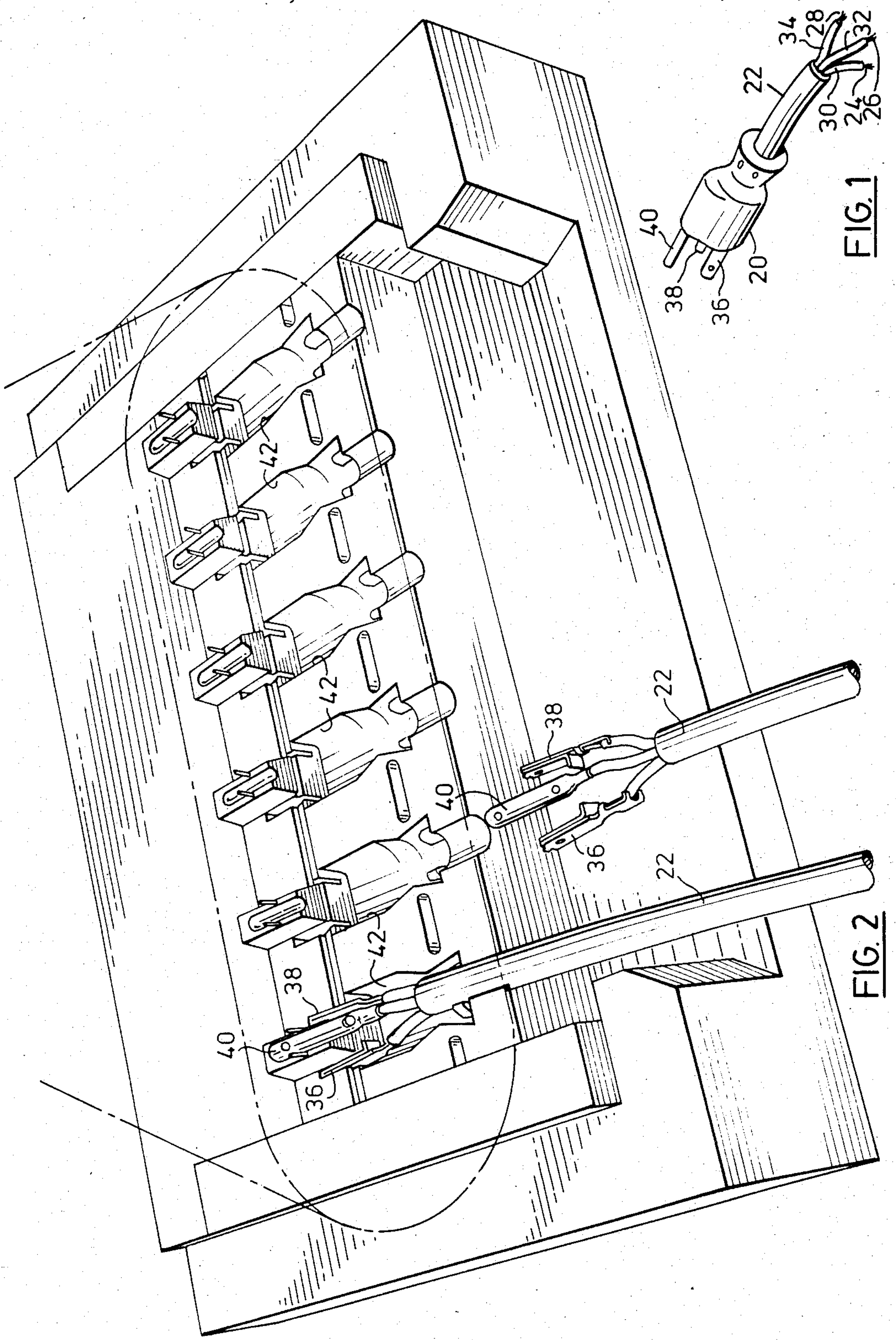
FIG. 1 is a perspective view of an exemplary termination on the end of a flexible cable for use in connecting an electrical appliance to an electrical outlet receptacle.
FIG. 2 is a perspective view somewhat diagrammatically of a lower half of a mould in which six cables having contacts are positioned for moulding terminations on the cables.

Reference is made first to FIG. 1 which illustrates a typical termination in the form of a plug 20 moulded to the end of a flexible cable 22. This particular cable carries three wires 24, 26, 28 each of which is surrounded by a different coloured insulator 40, 42, 44 respectively. The wires are attached internally of the plug 20 to three contacts 36, 38, and 40. In normal use the contact 40 is a ground connection and the other two contacts complete the circuit. It is therefore evident that for proper connection, during the manufacture of the moulded plug, it is imperative that the wires with their coded coloured insulation are connected to the appropriate contacts and then moulded in the allocated positions. The present invention provides a check that the wires are placed correctly in the mould as will be described.

Reference is next made to FIG. 2 which is a somewhat diagrammatic view of the lower half of a mould for use in a moulding machine as will be described with reference to FIG. 3. For the moment, it is sufficient to describe that the mould has six cavities 42 for moulding terminations such as plug 20 shown in FIG. 1. An operator is presented with an empty mould which is to be filled with cables 22, to which contacts 36, 38 and 40 have already been attached. The operator works from memory to place the contacts in the mould such that the coloured insulations are in a required arrangement. This arrangement is constant unless a new set of colours is used. Should the operator fail to arrange the colours correctly, the present apparatus will immobilize the mould (as will be described) making it impossible for the operator to complete the moulding step. Evidently, the cables could be any length and the short portions shown in the drawing indicate only the ends of the cables.

Figure 3:
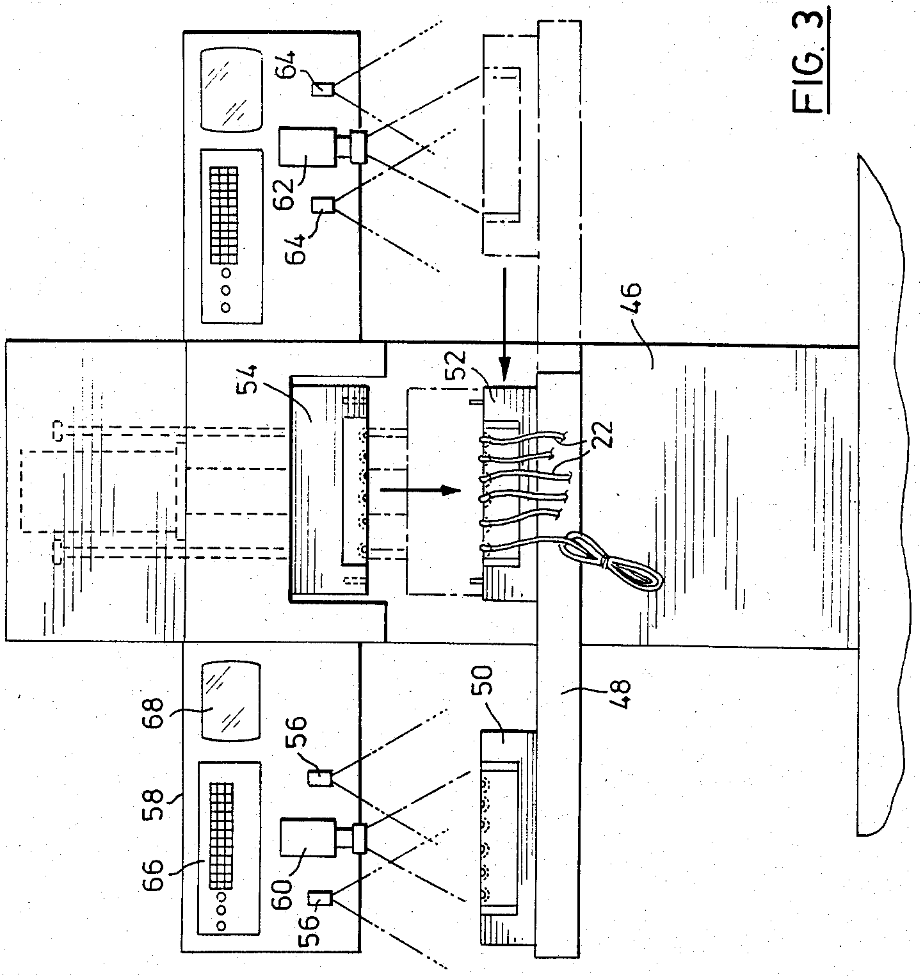
FIG. 3 is a diagrammatic view of a moulding machine to which the apparatus according to the invention is attached for checking the correctness of the positioning of coloured insulation on the wires of the cables in the mould with reference to the colours of the insulated wires and associated contacts.

Reference is next made to FIG. 3 which illustrates diagrammatically a moulding machine 44 having a pedestal 46 on which a shuttle 48 can recipricate between the position shown in solid outline and the position shown in ghost outline. The shuttle carries a pair of similar lower mould halves 50, 52 so that these mould halves can be positioned alternately under the top mould half 54. In the position shown the bottom mould half 52 is aligned with the top mould half 54 and cables 22 are in position ready for the top mould half 54 to be brought down into engagement with the half 52 to permit injection moulding. After the moulding is complete, the half 54 is raised back to the position shown in FIG. 3, the shuttle 48 is moved into the ghost-outline position, so that the half 52 can be stripped of the cables and moulded terminations while a new set of cables carried by the half 50 are ready to receive terminations in a further moulding cycle.

In the position shown in FIG. 3, the moulding cycle is about to take place with respect to the mould half 52 and during this cycle an operator places cables in the mould half 50 under lighting 56 which is provided on a cantilevered support 58. The lighting is arranged to illuminate the mould half 50 for enhancing the resolution of a colour camera 60 which is set up to look at an area identified in ghost outline in FIG. 2. This can be seen to include the mould cavities and in particular the coloured insulations on the wires of the cables 22. A similar arrangement of camera and lighting is provided on the other side of the moulding machine at 62 and 64 respectively for viewing the mould half 52 after this has been shuttled into the ghost outline position.

The camera 60 is associated with a keyboard 66 and CRT display 68. As will be described, the checking system is pre-programmed with the colour codings and locations to be used by the operator in placing the cables in the mould. The camera looks at cables as they are positioned and the information is compared with stored information to be sure that the colour arrangements are correct. In the event that there is an error, an error display will appear on the CRT 68 indicating where the error is, and the operator will not be able to operate the moulding machine until the error is corrected. Once this is done the comparison between memory and camera informations will create a signal permitting moulding so that the moulding cycle can proceed. The mould half 50 will then be moved into position for moulding resulting in the mould half 52 being positioned under the camera 54 where it is stripped and then loaded with the same checking taking place using the camera 64.

Figure 4:
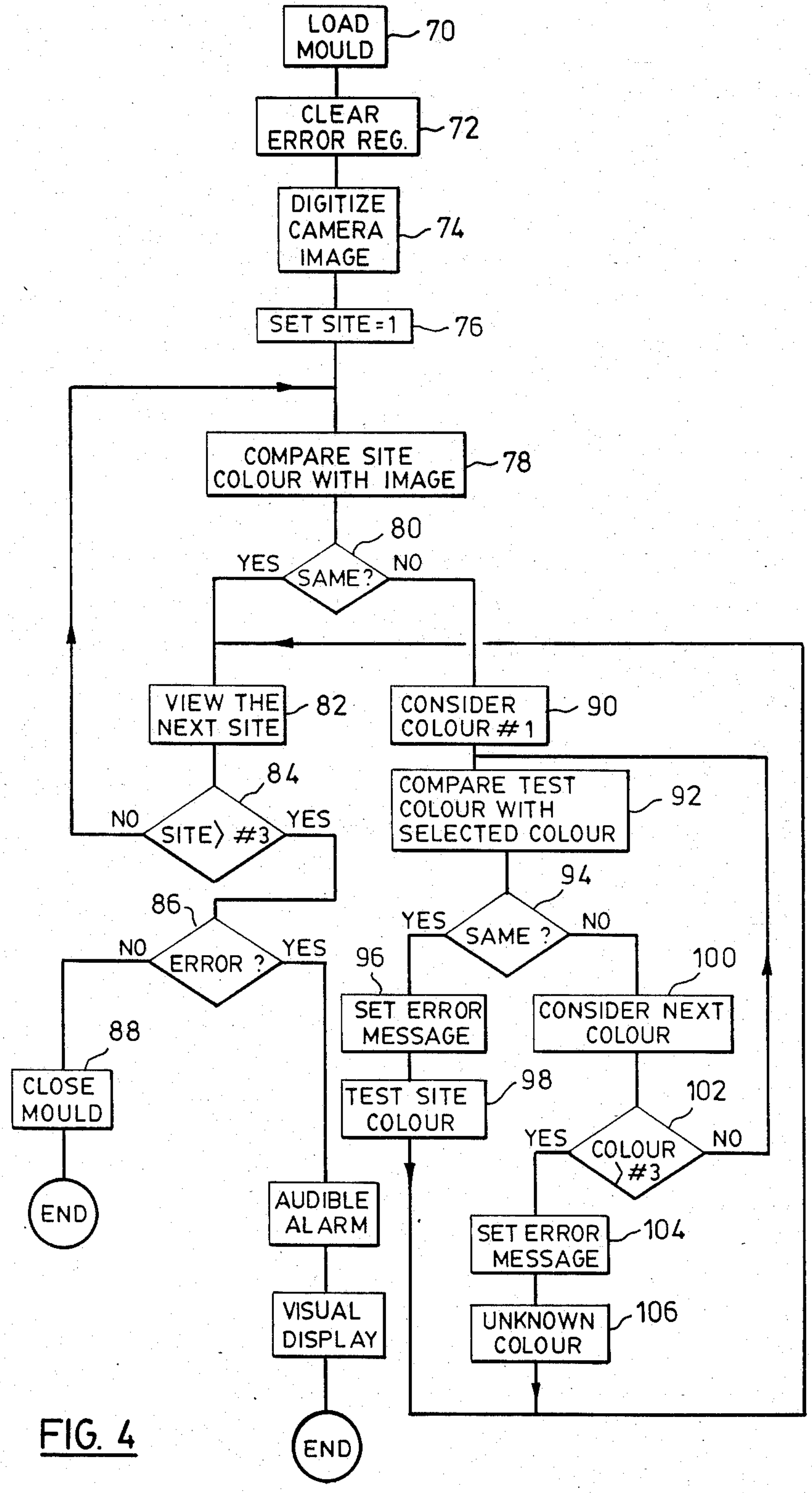
FIG. 4 is a flow chart showing how the apparatus functions.

Reference is made to FIG. 4 which is a flow chart showing how the apparatus operates to permit closing the mould only when the coloured insulations on the wires show in the proper relationship in the mould.

The hardware consists of a computer, the colour camera described previously, a colour digitizing board (preferably an AT&T Image Capture Board) for converting signals from the camera into digitized information, and a colour monitor for displaying images seen by the camera.

The camera converts a visual field into a standard colour video signal using a solid state image sensor. The signal is received by a colour digitizing board to convert information from the camera to numeric data which can be processed by the computer. The digitizing board divides the video screen information from the camera into a matric of visual fields or pixels. Medium resolution is satisfactory for this purpose using a matrix of 250 by 250 pixels. There are of course three separate colour components, namely, red, green and blue so that by combining these primary colours any other colour can be created. The digitizing process converts a picture into pixels and measures the intensity of each red, green and blue component using a 5-bit resolution for each of the red, green and blue components. This provides a matrix of 65536 pixels, each containing one of 32768 possible colour codes.

Before the equipment is used to determine the actual arrangement in the mould, it is necessary to set up the equipment so that it knows the proper arrangement for comparing with the actual arrangement. Cables and coloured insulation are placed in the cavity ensuring that these are in the proper relationship and the camera captures this information which is then digitized and memorized by the computer. Conveniently, the image to be tested for colour compliance is located in different areas of the picture and electronic zoom function is used to enlarge test sites so that with cursor controls particular pixels can be selected as representative of the colour expected in a particular site. The procedure is repeated to build up a reference table for proper location of sites and colour characteristics within those sites.

It will be evident that the prime purpose of the apparatus is to prevent moulding around wires which have been placed incorrectly in the mould. However, the apparatus to be described with reference to FIG. 4 goes further than this because it displays an error which both identifies which of the sites contain an incorrect wire and also what the colour of that wire is.

Referring to FIG. 4 the mould is loaded as indicated by the operation block 70. Next, the error register is cleared at 72 before images from the camera 60 (FIG. 3) are digitized at 74. At this point, the program is set to consider the image at site 1 (as indicated at 76) and this site would typically correspond to a view of one of the insulation covered wires of the cable at an end of the mould 50. Information from this site is, as mentioned earlier, broken down into pixels, and each pixel is considered within that site. Consequently, the next step is as indicated by numeral 78 to compare the information from that site with the colour image anticipated for that site should the wire be in the correct location. Comparison is made and a decision at 80 indicates whether or not the colour is as anticipated. For the moment, assume that the correct colour is in that site, then the flow chart passes to the left of decision 80 and proceeds down to step 82 where the program indexes to the next test site which will be the second wire of the cable. Because there are only three wires it is necessary to limit the indexing to three steps as shown at 84. Because we are considering the second wire of the first cable, the answer from 84 is "no" which loops the flow chart back to repeat element 78. This time a comparison is being made with the second site and the colour being anticipated at that site. Should this be the same, then another loop will take place to consider the third colour at the third site. It is necessary to do this because it is conceivable that one of the wires will be missing or even that the cable itself is faulty providing unexpected colours.

For the moment, assuming that the correct colour is found at the third site, then the decision at 84 will show that after indexing once more, the site number is greater than three which will move the decision process from the loop to decide whether or not an error exists at 86. Assuming no error has been found, then an action at 88 will take place to permit the mould and this ends the cycle.

Because the mould contains 6 cables, the process just described must be repeated for all 6 cables using repeated sites at different locations as can be seen from FIG. 2.

Now consider a situation in which the information from the first site shows that the colour is not that which was expected at that site. At 80 the test shows "no" leading the flow path to new considerations. The tests set up now are to find out which wire is at that location and what its colour is. The view of the colour seen prior to this part of the flow chart is ignored and all three of the colours are tested at the first site. Step 90 is a consideration of a first of the three colours remaining with the first site. A comparison is made with a first of the three selected colours at 92, and if it is found to be that the colour selected is in fact at that site, then the answer at 94 is "yes" and an error message is set at 96, 98 before looping back to enter the next site via 82. In other words, a colour has been identified at site 1: it is not the correct colour, but we now know what the colour is so that the flow chart can move to site 2. Evidently, if the three wires provided have the correct colours, then two or three have been placed incorrectly. Nevertheless, the loop goes back to the next site because this moves the consideration from the first site to the second site. Since we are only at the second site, 84 will cause the path to go back to 78 where the second site is compared with the correct colour for that site. Assuming that the correct colour is found, then the cycle passes to 84 where the decision is made that the third site is no greater than 3 and the loop repeats. Because the first wire was the incorrect colour, it is likely that this time the third wire at the third site will show the wrong colour for this site leading back to consideration at 90. Again, the colour will be incorrect leading through 96, 98 and back to the indexing at 82 to site number 4. The test at 84 will then show that the number is greater than 3 leading to the error decision at 86. Because an error was found both in the first site and the third site, the error message will show both as an audible alarm and as a visual display of the actual errors. The operator will then be aware of where the corrections have to be made and can either replace the faulty cable, or if it is simply a matter of reversing wires, then this can be done and the test will be repeated, and if the colours are now correct, the mould will be closed at 88.

There is also a situation where it is possible that a wire is missing completely or possibly not placed in the mould. Consider a situation such as this where decision 80 provides a negative answer leading to consideration at 90. The comparison at 92 with the first selected colour will be negative leading to consideration of the next colour at 100. Because decision 102 shows the colour number to be less than 3, the flow chart loops back to 92. The test will be repeated with the second colour leading again to a negative answer and the loop will lead back for comparison at 92 with the third colour. This time there will again be a negative answer and 92 will index to fictitious number 4. Because there are only three colours the decision at 102 would provide an affirmative answer leading to setting the error message, at 104, 106 to be an unknown colour. This of course could simply be a cable that has a colour in it which has not been programmed into the equipment or more likely, a wire that has been severed and is missing from the mould. The system thus returns to 82 to review other sites.

It will be evident that the flow chart provides a test to ensure that the correct colour coding is in the correct sites of the mould and that because of the interlock with the function 88, the moulding equipment cannot be operated until this condition exists.

As mentioned earlier, another consideration in the efficiency of manufacturing terminations on cables, is the possibility that the contacts have been attached to the wrong wires. In the apparatus shown, the contacts are shaped such that incorrect attachment would make it difficult if not impossible to place the contacts in the mould. This in itself is a test because the operator would presumably place the contacts correctly and then the equipment would show that the wires attached to those contacts are in the correct or incorrect arrangement. However, a more positive test is to use the equipment at the time the contacts are attached to the wires. Although not shown in the drawings, it is evident that crimping equipment is used to place the contacts on the wires and that the contacts must be placed in the crimping equipment relative to the wires. By using an arrangement similar to that described, the wires can be checked to be sure that they are in the correct relationship relative to the crimping equipment and therefore to the contacts.

In general, the present apparatus provides for checking colour arrangements of wire when operation is to be conducted on the ends of the wires, either by crimping contacts or by moulding terminations.

The invention can evidently take many forms and it is intended that such forms are within the scope of the present invention as described and claimed.

We claim:

1. Apparatus for use with a machine used to perform an operation on ends of cables, each of the cables having a plurality of wires coded individually in differently coloured insulation, and each of the wires being intended for location at discrete sites in the machine prior to the operation, the apparatus comprising;

a colour responsive camera focused to create an electronic image of the coloured insulations when the wires are on the sites and in place for the operation;

memory means containing first information corresponding to the colours and locations of the insulations when these insulations are positioned correctly in the machine;

comparator means receiving the electronic image and converting the image into second information including means comparing the first and second informations to create a first signal indicating that the informations correspond; and means coupled to the machine to render the machine inoperable in the absence of said signal and to permit normal operator use of the moulding machine on receiving said signal.

2. Apparatus as claimed in claim 1 in which the comparator means creates a second signal when the informations do not correspond and in which the comparator means further includes identifying means which, upon receiving the second signal, compares the second information with further information to identify the colour of the wire insulation.

3. Apparatus as claimed in claim 2 and further including error indicating means receiving information from the identifying means to show the error in the colours of the wire insulations at the sites.

4. A method of recognizing an error in an array of wires each of which has a differently coloured insulation, the method comprising the steps:

placing wires on sites in the required placement and colour arrangement;

recording the placing and colour arrangement using a colour video camera and digitizer in the form of a digital first information;

replacing the wires with new wires to be tested at the sites;

viewing the new wires with the video camera and digitizing the picture information with respect both to placement and colour of the insulation on the wires; and comparing said first information with the picture information and creating either a first signal indicating that the new wires are positioned and arranged correctly, or a second signal indicating an error in the colour of the insulation appearing at at least one of the sites.

5. A method as claimed in claim 4 and further comprising the steps;

receiving a second signal to trigger the following steps;

comparing the picture information with respect to colour with stored information to identify the colour; and creating an error signal to show the colour appearing incorrectly at a site and the site where this colour appears.

* * * * *